(12) United States Patent
Renfro

(10) Patent No.: US 9,679,135 B2
(45) Date of Patent: Jun. 13, 2017

(54) COMPUTING DEVICE FOR SECURED TRANSACTIONS AND VIRTUAL MONITORING EXTERNAL FROM THE OPERATING SYSTEM

(71) Applicant: BANK OF AMERICA CORPORATION, Charlotte, NC (US)

(72) Inventor: Chadwick R. Renfro, Midlothian, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 17 days.

(21) Appl. No.: 14/707,169

(22) Filed: May 8, 2015

(65) Prior Publication Data
US 2016/0328558 A1 Nov. 10, 2016

Related U.S. Application Data

(63) Continuation of application No. 12/142,177, filed on Jun. 19, 2008, now abandoned.

(51) Int. Cl.
*G06F 21/00* (2013.01)
*G06F 21/56* (2013.01)
(Continued)

(52) U.S. Cl.
CPC .......... *G06F 21/56* (2013.01); *G06F 9/45558* (2013.01); *G06F 21/16* (2013.01);
(Continued)

(58) Field of Classification Search
CPC ........ G06F 21/566; G06F 21/56; G06F 21/52; G06F 21/55
(Continued)

(56) References Cited

U.S. PATENT DOCUMENTS 6,618,735 B1 9/2003 Krishnaswami et al.
6,971,018 B1 11/2005 Witt et al.
(Continued)

FOREIGN PATENT DOCUMENTS

KR 20080050840 6/2008
WO 0072508 A1 11/2000
(Continued)

OTHER PUBLICATIONS

U.K. Patent Office Search Report issued on Sep. 25, 2009, in re British Patent Application No. 0910441.5, filed Aug. 16, 2011.
(Continued)

*Primary Examiner* — Syed Zaidi
(74) *Attorney, Agent, or Firm* — Michael A. Springs; Moore & Van Allen PLLC; James C. Edwards

(57) ABSTRACT

A secure computer for secure transactions that includes an operating system, a processor, an identity security module, and a loss protection device. The operating system has built-in security features. The processor is manufactured with security features and configured to execute software in a virtualized state outside of the operating system. The computer includes or be able to create at least one virtualized monitoring application that operates outside of the operating system and. monitor system files and duplicate files of the system files for modification by malicious software, such that any of the duplicate files or system files determined to be modified by malicious software are restored to one of an original version or a known operative state and generates and communicates an alert indicating possible suspicious activity based on the determined modification.

18 Claims, 4 Drawing Sheets

(51) Int. Cl.
*G06F 21/32* (2013.01)
*G06F 21/64* (2013.01)
*G06F 21/62* (2013.01)
*G06F 21/16* (2013.01)
*G06F 9/455* (2006.01)
*H04L 29/06* (2006.01)
*H04L 29/08* (2006.01)

(52) U.S. Cl.
CPC .......... *G06F 21/32* (2013.01); *G06F 21/6245* (2013.01); *G06F 21/64* (2013.01); *H04L 63/1475* (2013.01); *G06F 2009/45587* (2013.01); *H04L 63/06* (2013.01); *H04L 67/02* (2013.01)

(58) Field of Classification Search
USPC .............................................................. 726/1
See application file for complete search history.

(56) References Cited

U.S. PATENT DOCUMENTS

| | | | |
|---|---|---|---|
| 7,093,086 B1* | 8/2006 | van Rietschote | ... G06F 11/1438 711/161 |
| 7,111,172 B1 | 9/2006 | Duane et al. | |
| 7,689,607 B2 | 3/2010 | Oks et al. | |
| 2002/0112171 A1 | 8/2002 | Ginter et al. | |
| 2003/0014636 A1 | 1/2003 | Ahlbrand | |
| 2004/0111640 A1 | 6/2004 | Baum | |
| 2004/0139315 A1 | 7/2004 | Tokutani et al. | |
| 2005/0065874 A1 | 3/2005 | Lefner et al. | |
| 2005/0138370 A1 | 6/2005 | Goud et al. | |
| 2005/0182956 A1 | 8/2005 | Ginter et al. | |
| 2005/0226468 A1 | 10/2005 | Deshpande et al. | |
| 2006/0031927 A1 | 2/2006 | Mizuno | |
| 2006/0101282 A1* | 5/2006 | Costea | ... G06F 21/56 713/188 |
| 2006/0137010 A1* | 6/2006 | Kramer | ... G06F 21/554 726/22 |
| 2006/0230260 A1 | 10/2006 | Szolyga et al. | |
| 2006/0268902 A1 | 11/2006 | Bonner | |
| 2007/0030149 A1 | 2/2007 | Hoerner | |
| 2007/0136579 A1 | 6/2007 | Levy et al. | |
| 2007/0271610 A1 | 11/2007 | Grobman | |
| 2008/0126446 A1 | 5/2008 | Brunet et al. | |
| 2008/0270787 A1 | 10/2008 | LaCous | |
| 2009/0158441 A1 | 6/2009 | Mohler et al. | |
| 2009/0319435 A1 | 12/2009 | Little et al. | |

FOREIGN PATENT DOCUMENTS

| | | |
|---|---|---|
| WO | 02071686 A1 | 9/2002 |
| WO | 2005027402 A1 | 3/2005 |
| WO | 2009062111 A4 | 7/2009 |

OTHER PUBLICATIONS

Description of "Secure Clean PC 2.11" taken from http://www.download32.com/secure-clean-pc-i26522.html released Oct. 3, 2005.
Description of "SureClean PC 2.0.1002" taken from http://www.download32.com/sureclean-i27038.html released Feb. 17, 2006.
Description of "Private Data Detector 1.0" taken from http://www.brothersoft.com/private-data-protector-50853.html last updated Oct. 27, 2006.
GB Search Report mailed May 4, 2010 for GB Application No. GB0910443.1.
LoJack for Laptops' Apr. 5, 2006, Internet Archive Wayback Machine.

* cited by examiner a "system." Furthermore, the present invention may take the

COMPUTING DEVICE FOR SECURED TRANSACTIONS AND VIRTUAL MONITORING EXTERNAL FROM THE OPERATING SYSTEM

CROSS REFERENCE TO RELATED APPLICATIONS

The present application is a continuation of co-pending U.S. patent application Ser. No. 12/142,177 entitled, "Secure Transaction Personal Computer" filed on Jun. 19, 2008, the entire contents of which is herein incorporated by reference and is assigned to the same assignee as the present application, and from which priority is claimed under 35 U.S.C. §120.

BACKGROUND OF THE INVENTION

The present invention is related to personal computers, and more specifically to a secure transaction personal computer.

Currently, computer makers have begun to target specific user-bases by creating computer systems designed from the ground-up for specific purposes such as gaming. A computer designed with gaming in mind may be designed with special cooling systems, fast hard drives, plenty of memory, and extremely high-end video cards. The operating systems may also be specially designed for media intensive applications to run smoothly. As another example, blade terminal computers are designed to have limited to no local storage, but heavy network and memory capability to run remote applications seamlessly.

However, currently there is a problem where consumers feel uncomfortable interacting with online banking, online e-commerce systems, or other secure transaction systems where personalized financial information may be transferred. The current solution is to require a user to buy off-the-shelf (OTS) software from vendors to help provide some security for these type transactions. However, these applications are susceptible to being circumvented by malicious software, leaving a user's system at high chance of exposure to misappropriation of identity and becoming victims of misappropriation of funds.

BRIEF SUMMARY OF THE INVENTION

According to one aspect of the present invention, a secure computer for secure transactions includes an operating system, the operating system having built-in security features, a processor, the processor being manufactured with security features and configured to execute software in a virtualized state outside of the operating system, an identity security module, and a loss protection device.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
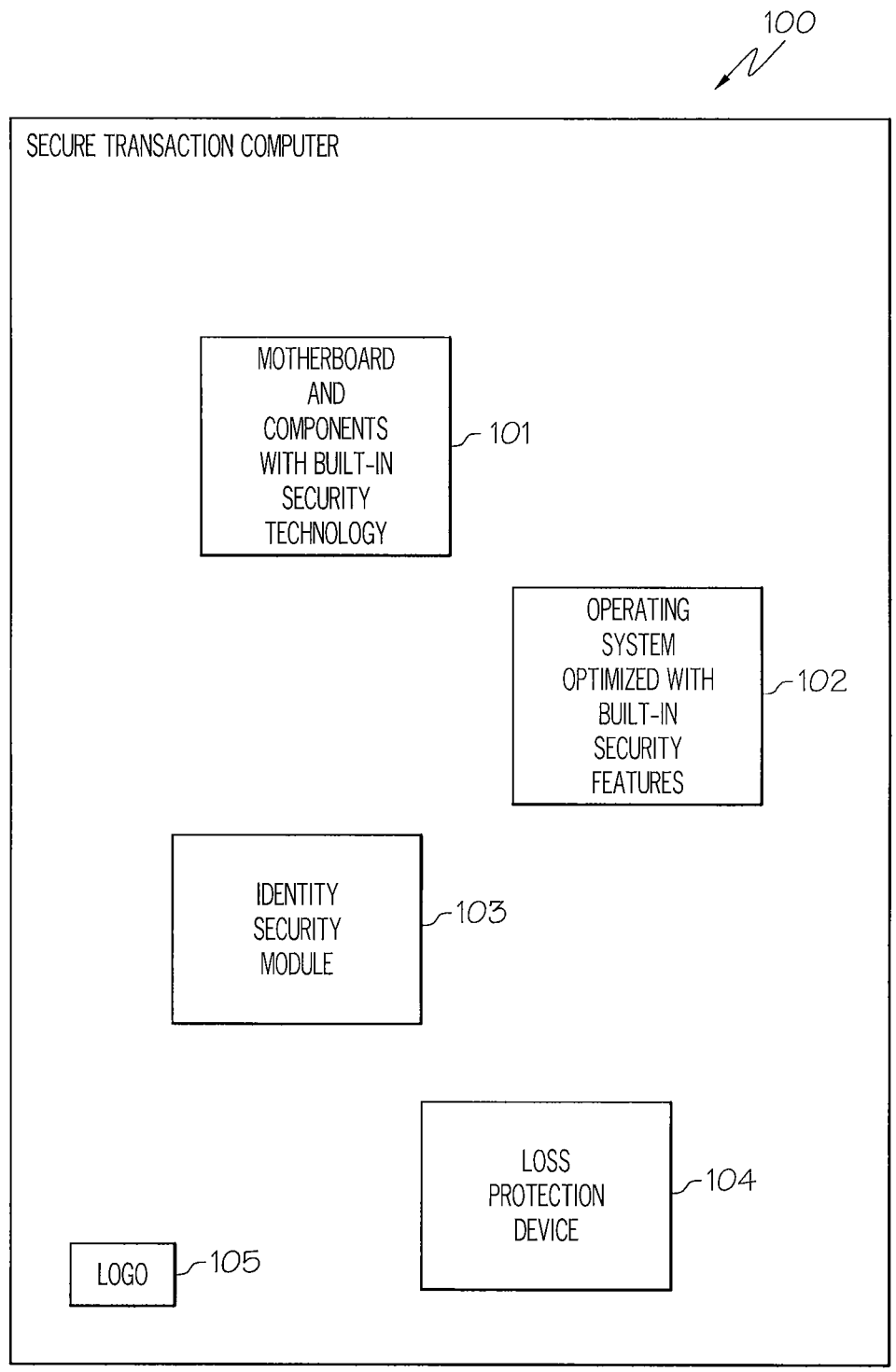
FIG. 1 is a diagram of a secure transaction computer according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, microcode, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, a secure computer is built with secure hardware, secure operating system, identity security, loss protection security, and may be branded to denote that the computer has been designed with an abundance of security features and/or with a name or logo of a company. Embodiments according to the present invention build upon a secure hardware architecture that provides mechanisms for virtualization and separation of operating system (OS) level functions and applications from other applications and/or potential reporting systems. The secure hardware architecture enables secure status reporting as well as potential secure communication with other hardware functions such as a network interface card (NIC). A software system that runs on the secure hardware architecture may be virtualized to actually perform secure communication with online banking systems and secure transaction systems.

Further, embodiments according to the present invention may have a predetermined and hardened operating system installed on the secure computer (e.g., a hardened version of a Windows-based operating system). In embodiments according to the present invention, all security measures may be turned on to close any potential security holes (e.g., auto-update is set on, install antivirus with auto-update on, firewall is on, restrictions browser are set, etc.). This ensures that the secure computer security is tight, defeating many of the common problems with most systems today.

In addition to the hardware and operating system being tightened, additional security may be provided to protect the user's identity. For example, biometrics may be built-into the computer which allows users to use "what they are" to gain access to the use of the computer, replacing the typical password and keystroke based mechanisms that usually fall prey to eavesdropping by malware. Other examples of identity security used may include one-time password (OTP) technology, and gyro-passwords. The use of identity security, such as biometrics, adds a level of security that makes it difficult for malware or other software to sniff passwords, and provides many more secure opportunities to conduct transactions.

Moreover, according to embodiments of the present invention, a computer for secure transactions may be marked with a special logo to brand the system as a type of secure computer. This provides notice to a user that this computer is built with enhanced security for secure e-commerce, online banking and other secure type transactions. Embodiments according to the present invention may also include loss protection security, for example, Life Lock technology, Lo-Jack technology, etc., as well as special hardware measures such as hard drive locking. Hard drive locking technology insures that if the hard drive is stolen, it cannot run in a new system. This protects the data contained in the hard drive from others. Therefore, a secure computer according to embodiments of the present invention mediates many of the exposure factors such as key logging and typical malware by providing restricted access (e.g., using biometrics), a secure hardware architecture, and a hardened and secure operating system.

As noted previously, embodiments according to the present invention may include a processor with a secure hardware architecture that has the ability to run software code in a virtualized state outside of the running operating system. For example, an instance of a web browser may be "flipped" into a virtualized state and operate outside of the OS, thus preventing eavesdropping by malware. In addition, according to embodiments of the present invention, the computer system may be security hardened by duplicating essential system files, thus preventing overwriting by malicious software. Also, global policies may be put in place that may restrict what users may do, and may provide requirements to users for passwords or other mechanisms before allowing system modifications. The computer system may also include monitoring software that monitors the execution of programs and looks for suspicious behavior. The monitoring software may alert the processor if suspicious behavior has been detected. The computer system, according to the present invention, may also include software that tracks security events (similar to an auditing system) that may covertly send notifications regarding detected security events back to a central location that stores and tracks security events (e.g. a corporate database). The monitoring software and the tracking software may run in a virtualized environment outside of the OS, and "watch" in parallel as the OS runs. This provides a segment so that the OS can't see the software in the virtualized state and therefore, malicious software can't modify it.

The OS may be configured such that if either the original essential system files or the duplicates of the essential system files are modified, they are reverted back to either their original state or a known good state. Since both the original and duplicate essential system files can't be modified at the same time, they may be used to correct each other if one of them is modified. Further, according to embodiments of the present invention, global policies may be set or modified by a user with administrator rights (or domain rights at a corporate level). The processor may issue security related alerts to a user identifying any ramifications of making certain modifications to the system. In addition, according to embodiments of the present invention, the policies may be set, modified, or completely disabled as desired by an appropriate user with the appropriate rights (e.g., administrator rights). Moreover, according to embodiments of the present invention, virtualized software may be used to create secure on-time session keys or private keys for a public key infrastructure (PKI) and be used as a secure "store", thus preventing malicious software from being able to use/sniff the keys. This provides for a more secure communication.

FIG. 1 shows a diagram of a secure computer according to an example embodiment of the present invention. The secure transaction computer 100 may include a motherboard 101 with components such as, for example, a processor with built-in security technology, an operating system 102 optimized with built-in security features, an identity security module 103, a loss protection mechanism 104, and a logo or mark 105. The motherboard 101 may include a processor having built-in security features. Further, the processor on the motherboard 101 may be configured to run applications outside of the operating system 102. The identity security module 103 may be any type of identity security such as, for example, OTP, biometrics, gyro-passwords, etc. The loss protection 104 may include any type of loss protection such as, for example, Lo-Jack, Life Lock, hard disk lock schemes, etc. The log/mark 105 may be a corporate logo or may simply be a brand or term denoting the secure computer as an "e-commerce computer", "online banking computer", "secure transaction" computer, "BofA Bank", etc. conveying the computer's enhanced security features for secure transaction systems such as e-commerce and online banking systems.

Figure 2:
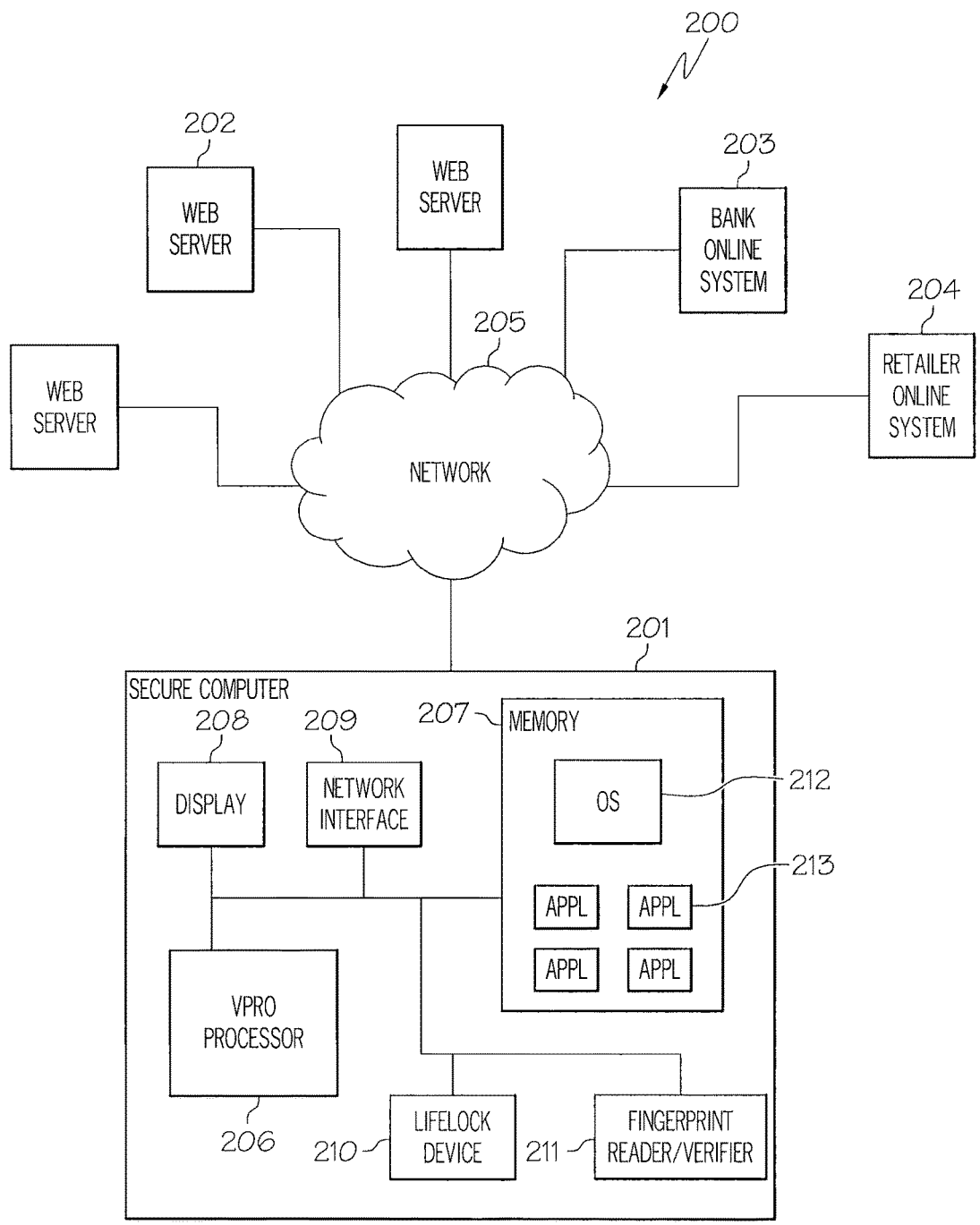
FIG. 2 is a system for secure transactions according to an example embodiment of the present invention.

FIG. 2 shows a system for secure transactions according to an example embodiment of the present invention. The system 200 may include a secure computer 201 that may be interconnected via a network 205 (e.g., the Internet) to one or more different types of web servers 202, such as an online banking system 203, a retailer online system 204, etc. The secure computer 201 may access one or more of these web servers 202, 203, 204, and conduct e-commerce, online banking, or other secure transactions or activities. The secure computer 201 may include a processor 206, a display 208, a network interface 209, a memory 207, a Life Lock device 210, and a fingerprint reader/verifier 211. The memory 207 may contain an operating system 212 and one or more different applications 213. The processor 206 may be configured to execute and run applications through the operating system 212 or outside of the operating system 212.

Figure 3:
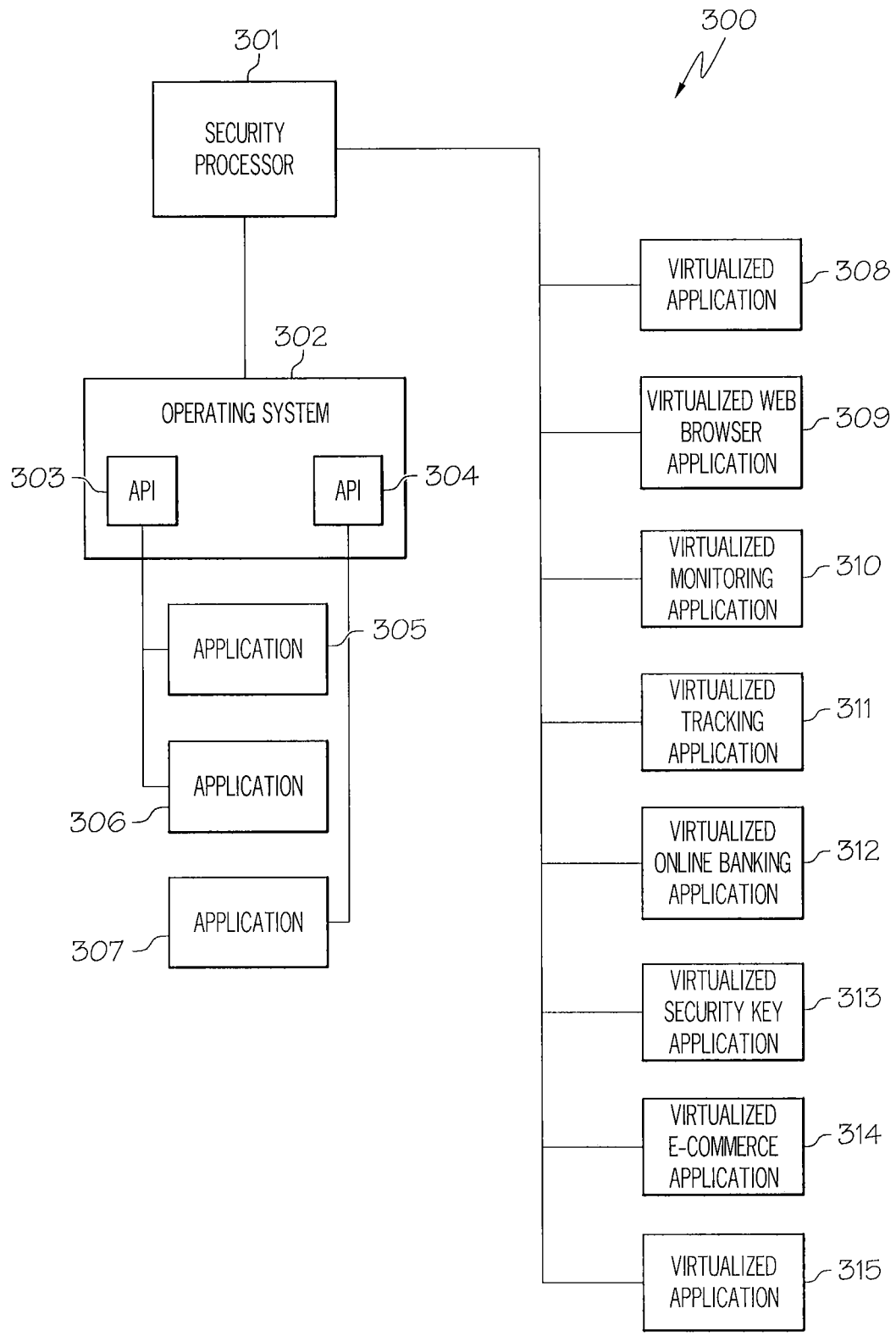
FIG. 3 is a system for running virtualized applications according to an example embodiment of the present invention.

FIG. 3 shows a system for running virtualized applications according to an example embodiment of the present invention. The system 300 may include a security processor 301 that runs an operating system 302. The operating system 302 may include one or more application programming interfaces (API) 303, 304, that interface with one or more applications 305, 306, and 307. Further, the system 300 may include one or more virtualized applications 308-315 that may be run or executed by the security processor 301 outside of the operating system 302. The virtualized applications may be virtualized instances of the one or more applications 305, 306, and 307 or may be other virtualized applications. The virtualized applications may include a virtualized web browser application 309, a virtualized monitoring application 310, a virtualized tracking application 311, a virtualized online banking application 312, a virtualized security key application 313, a virtualized secure transaction application 314, etc. By operating outside of the operating system 302, the operating system 302 and other applications are protected against malicious software that may attack one of the virtualized applications 309-314.

Figure 4:
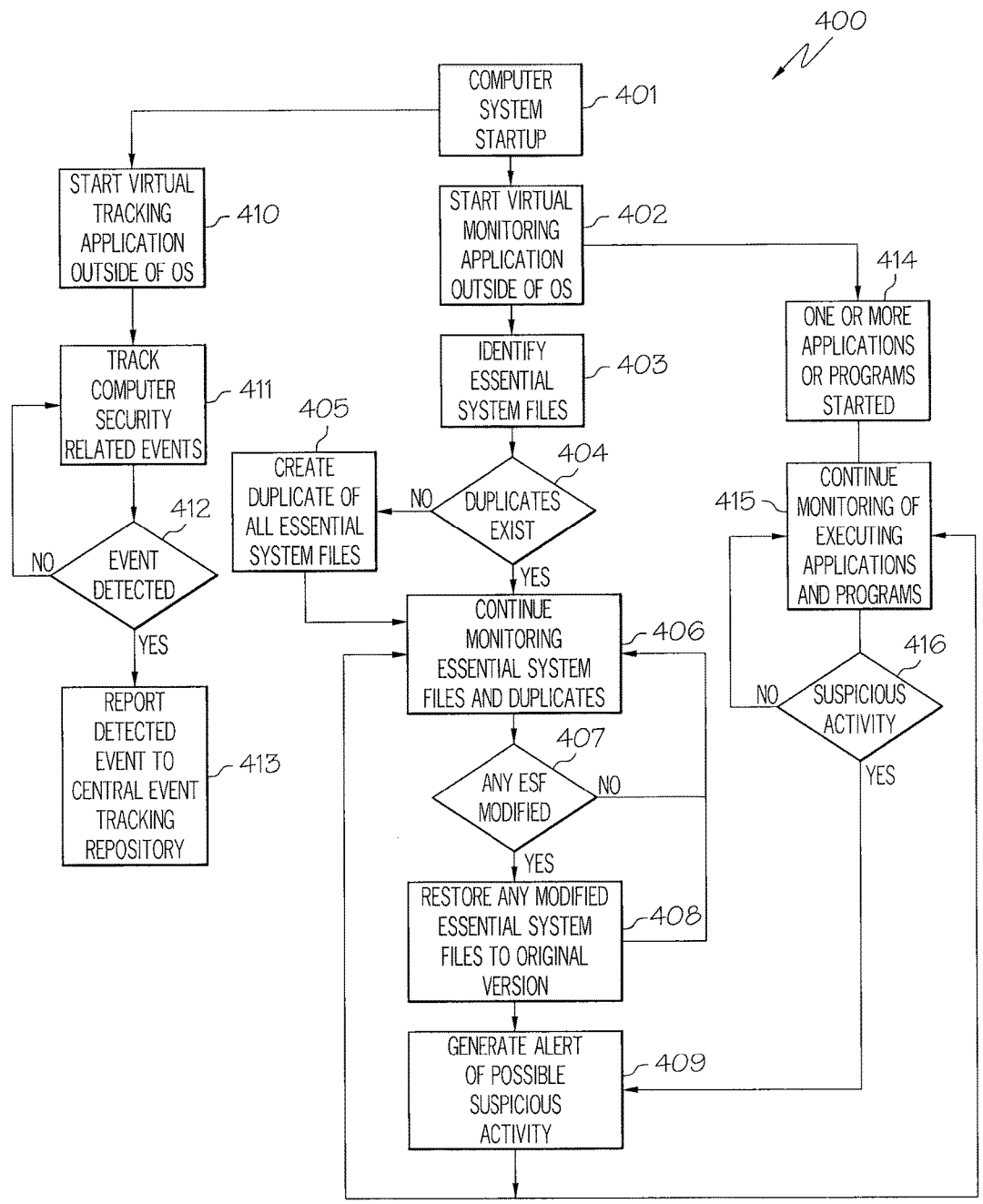
FIG. 4 is a flowchart of a process for secure online transactions according to an example embodiment of the present invention

FIG. 4 shows a flowchart of a process for secure online transactions according to an example embodiment of the present invention. In the process 400, in block 401, a computer system may be started up (e.g., powered up and booted). In block 402 a virtual monitoring application may be started and executed where the virtual monitoring application runs outside of the operating system. In block 403, all essential system files may be identified. In block 404, it may be determined if duplicates of the essential system files exist and if not; in block 405, duplicates of all essential system files may be created. If duplicates do exist or after all duplicates of essential system files have been created, in block 406 the essential system files and duplicates of these files may be continued to be monitored by the virtual monitoring application. In block 407, it may be determined if any of the essential system files or the duplicate files has been modified and if not, the monitoring may continue. If any of the essential system files or duplicate essential system files have been modified, in block 408, any modified essential system file or duplicate essential system file may be restored to its original version or to a known good state. Then in block 409, an alert of possible suspicious activity may be generated and the process return back to block 406, where monitoring of the essential system files and duplicates continues.

Further, after the computer system's startup in block 401, in block 410 a virtual tracking application may also be started and run outside of the operating system. Then in block 411, computer security related events may be tracked by the tracking application. In block 412, it may be determined if a security related event has been detected and if not, then the process may return to block 411 where computer security related events may be continued to be tracked. If a security related event has been detected, then in block 413 the detected event may be reported to a central event tracking repository or other entity.

In block 402, after the virtual monitoring application has been started, in block 414, one or more applications or programs may be started, executed or run. In block 415, the virtual monitoring application (or a different virtual monitoring application) may continue monitoring of the executing applications and programs. In block 416, it may be determined if any suspicious activity has been detected based on monitoring the execution of any of the applications and programs and if not, the monitoring may continue. If suspicious activity has been detected, then in block 409, an alert of possible suspicious activity may be generated. The alert may be generated on a display of the computer system or generated and sent exterior to the computer system.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A secure computer device for secure transactions, the device comprising:
    a memory;
    an operating system, stored in the memory, including built-in security features;
    a processor, in communication with the memory, including security features and configured to execute the operating system and to execute software in a virtualized state outside of the operating system;
    a virtual monitoring application, stored in the memory, executable by the processor and configured to: (i) continuously monitor in a virtualized state outside of the operating system, system files and duplicate files of the system files to determine if a duplicate files exist for each of the system files and create a duplicate file for a corresponding system file, if a duplicate file was determined not to locally exist, (ii) continuously monitor in the virtualized state, system files and duplicate files of the system files for modification by malicious software, and automatically restore, to one of an original version or a known operative state, any of the duplicate files or system files determined to be modified by malicious software, and (iii) in response to determining modification of the duplicate files or system files by malicious software and restoring the duplicate files or system files to the original version or the known operative state, generate and communicate an alert indicating possible suspicious activity based on the determined modification, wherein the virtual monitoring application is configured to operate in the virtualized state outside of the operating system, wherein operating the virtual monitoring application in the virtualized state prevents any modifications to the virtual monitoring application by malicious software;
    a marking on the secure computer device that indicates that the secure computer device includes enhanced security features for secure electronic commerce transactions;
    an identity security module stored in the memory and executable by the processor; and
    a loss protection device in communication with the processor.

2. The computer device according to claim 1, wherein the processor comprises virtualization technology.

3. The computer device according to claim 1, wherein the computer device further includes at least one virtualized software module, stored in the memory, executable by the processor and configurable to operate in a virtualized state outside of the operating system.

4. The computer device according to claim 3, wherein the computer device further includes a web browser, stored in the memory, executable by the processor and configurable to operate in a virtualized state outside of the operating system.

5. The computer device according to claim 4, wherein the web browser is configurable to operate in a virtualized state outside of the operating system, at least one of, when accessing a secure site, when accessing an e-commerce site, when accessing a secure transactions site or upon selection by user.

6. The computer device according to claim 3, wherein the computer device further includes a tracking application, stored in the memory, executable by the processor, configured to track security related events and report these events to a central event tracking repository, and configurable to operate in a virtualized state outside of the operating system.

7. The computer device according to claim 3, wherein the at least one virtualized software module is configurable to operate in a virtual state outside of the operating system for secure communication with, at least one of, an online banking system, an e-commerce web site, or a secure transactions system.

8. The computer device according to claim 1, wherein the computer device further includes a virtualized security key software module, stored in the memory, executable by the processor, configured to generate security keys and manage secure key session communications, and configurable to operate outside of the operating system.

9. The computer device according to claim 1, further comprising a logo marking displayed on an exterior surface of the computing device and operable to communicate to a user that the computer device is configured for security.

10. The computer device according to claim 1, wherein the virtual monitoring application is further configured to prevent malicious software from over-writing the system files and the duplicate files.

11. The computer device according to claim 1, wherein the operating system is further configured to implement global policies that place restrictions on user actions on the computer.

12. The computer device according to claim 11, wherein the operating system is further configured to implement the global policies, wherein the global policies are set or modified by an administrator.

13. The computer device according to claim 1, wherein the identity security module further comprises biometrics.

14. The computer device according to claim 1, wherein the loss protection device comprises, at least one of, a Lo-Jack device, a Life Lock device, or a hard disk lock device.

15. A method for computer device security, the method comprising:
    monitoring system files and duplicate files of the system files to determine if a duplicate files exist for each of the system files and create a duplicate file for a corresponding system file, if a duplicate file was determined not to locally exist;
    continuously monitoring, by a computing device processor operating in a virtualized state outside of an operating system, a plurality of system files and corresponding duplicate files for modification by malicious software;

automatically restoring, by the computing device processor operating in the virtualized state outside of the operating system, to a known operative state, any system files or duplicate file determined to have been modified by malicious software; and in response to determining modification of the duplicate files or system files by malicious software and restoring the duplicate files or system files to the original version or the known operative state, generating and communicating, by the computing device processor, operating in the virtualized state outside of the operating system, an alert indicating possible suspicious activity based on the determined modification.

16. The method of claim 15, further comprising:

identifying, by the computing device processor in the virtualized state outside of the operating system, the plurality of system files;

determining, by the computing device processor in the virtualized state outside of the operating system, if a duplicate file locally exists for each of the system files; and creating, by the computing device processor in the virtualized state outside of the operating system, a duplicate file for a corresponding system file, if a duplicate file was determined not to locally exist.

17. A computer program product, including a non-transitory computer-readable medium storing a computer program including instructions executable by a processor to perform the steps of:

monitoring system files and duplicate files of the system files to determine if a duplicate files exist for each of the system files and create a duplicate file for a corresponding system file, if a duplicate file was determined not to locally exist;

continuously monitoring, in a virtualized state outside of an operating system, a plurality of system files and corresponding duplicate files for modification by malicious software; and automatically restoring, via a computing device in the virtualized state outside of the operating system, to a known operative state, any system files or duplicate file determined to have been modified by malicious software; and in response to determining modification of the duplicate files or system files by malicious software and restoring the duplicate files or system files to the original version or the known operative state, generating and communicating, via a computing device processor, an alert indicating possible suspicious behavior based on the determined modification.

18. The computer program product of claim 17, wherein the instructions executable by further perform the steps of:

identifying, via a computing device processor in the virtualized state outside of the operating system, the plurality of system files;

determining, via a computing device processor in the virtualized state outside of the operating system, if a duplicate file locally exists for each of the system files; and creating, via a computing device processor in the virtualized state outside of the operating system, a duplicate file for a corresponding system file, if a duplicate file was determined not to locally exist.

* * * * *